United States Patent
Yoshida et al.

(10) Patent No.: US 12,248,221 B2
(45) Date of Patent: Mar. 11, 2025

(54) DISPLAY DEVICE

(71) Applicant: Japan Display Inc., Tokyo (JP)

(72) Inventors: Koji Yoshida, Minato-ku (JP);
Hirofumi Ohira, Minato-ku (JP);
Soichiro Ohama, Minato-ku (JP);
Toshihiko Tanaka, Minato-ku (JP)

(73) Assignee: Japan Display Inc., Tokyo (JP)

( * ) Notice: Subject to any disclaimer, the term of this patent is extended or adjusted under 35 U.S.C. 154(b) by 370 days.

(21) Appl. No.: 17/652,793

(22) Filed: Feb. 28, 2022

(65) Prior Publication Data

US 2022/0179268 A1 Jun. 9, 2022

Related U.S. Application Data

(63) Continuation of application No. PCT/JP2020/029958, filed on Aug. 5, 2020.

(30) Foreign Application Priority Data

Sep. 2, 2019 (JP) .................................. 2019-159317

(51) Int. Cl.
*G02F 1/1362* (2006.01)
*B60K 35/00* (2024.01)
(Continued)

(52) U.S. Cl.
CPC ......... *G02F 1/136254* (2021.01); *G01K 7/16* (2013.01); *G02F 1/136286* (2013.01);
(Continued)

(58) Field of Classification Search
None
See application file for complete search history.

(56) References Cited

U.S. PATENT DOCUMENTS

2004/0207588 A1* 10/2004 Shiomi ............. G02F 1/133382
345/87
2012/0199856 A1 8/2012 Koresawa et al.
(Continued)

FOREIGN PATENT DOCUMENTS

JP 2008-181008 A 8/2008
JP 2015-210328 A 11/2015
(Continued)

OTHER PUBLICATIONS

International Search Report issued Sep. 24, 2020 in PCT/JP2020/029958, filed on Aug. 5, 2020, 6 pages (with English translation).
(Continued)

*Primary Examiner* — Shan Liu
(74) *Attorney, Agent, or Firm* — Maier & Maier, PLLC (57) ABSTRACT

According to an aspect, a display device includes: a substrate having a display region; and a plurality of temperature detection wiring lines each having a conductive thin wiring line arranged at a position overlapping with the display region in plan view. A light shielding layer is arranged so as to extend in a first direction in the display region, and the conductive thin wiring line is arranged at a position overlapping with the light shielding layer and extends in the first direction along the light shielding layer in plan view.

3 Claims, 8 Drawing Sheets

(51) Int. Cl.
*B60K 35/23* (2024.01)
*G01K 7/16* (2006.01)
*G02B 27/01* (2006.01)
*G02F 1/1335* (2006.01)

(52) U.S. Cl.
CPC .............. *B60K 35/00* (2013.01); *B60K 35/23* (2024.01); *B60K 2360/23* (2024.01); *G02B 27/0172* (2013.01); *G02F 1/133512* (2013.01)

(56) References Cited

U.S. PATENT DOCUMENTS

| | | | |
|---|---|---|---|
| 2016/0103358 A1* | 4/2016 | Tanaka | G06F 3/0412 |
| | | | 349/12 |
| 2016/0306169 A1 | 10/2016 | Nambara | |
| 2017/0279084 A1 | 9/2017 | Sakamoto et al. | |
| 2018/0090062 A1 | 3/2018 | Nakamura | |
| 2018/0090103 A1* | 3/2018 | Zhang | G01K 13/00 |
| 2018/0196554 A1* | 7/2018 | Ishizaki | G02F 1/133528 |
| 2019/0227371 A1 | 7/2019 | Kawamura et al. | |
| 2020/0201109 A1* | 6/2020 | Zhao | G02F 1/133382 |

FOREIGN PATENT DOCUMENTS

| | | |
|---|---|---|
| JP | 2016-51090 A | 4/2016 |
| JP | 2017-174553 A | 9/2017 |
| JP | 2018-54915 A | 4/2018 |
| JP | 2019-95472 A | 6/2019 |
| JP | 2019-128417 A | 8/2019 |
| WO | WO 2011/058596 A1 | 5/2011 |

OTHER PUBLICATIONS

Office Action issued on Jun. 27, 2023, in corresponding Japanese Application No. 2019-159317, 8 pages.

* cited by examiner

DISPLAY DEVICE

CROSS-REFERENCE TO RELATED APPLICATION

This application claims the benefit of priority from Japanese Patent Application No. 2019-159317 filed on Sep. 2, 2019 and International Patent Application No. PCT/JP2020/029958 filed on Aug. 5, 2020, the entire contents of which are incorporated herein by reference.

BACKGROUND

1. Technical Field

What is disclosed herein relates to a display device.

2. Description of the Related Art

What is called head-up displays (HUDs) that project an image onto a member having a light-transmitting property, such as glass, have been known (for example, Japanese Patent Application Laid-open Publication No. 2015-210328 (JP-A-2015-210328)).

With the technology described in JP-A-2015-210328, sunlight may be incident on a display device through an optical system. When the display device is exposed to the sunlight condensed by the optical system, the display device may be deteriorated.

Japanese Patent Application Laid-open Publication No. 2016-051090 (JP-A-2016-051090) describes a liquid crystal display device in which a temperature sensor is arranged outside a display region. Since an incident state of sunlight varies depending on relative positions between the sun and the display device, the temperature sensor in JP-A-2016-051090 cannot always detect sunlight condensed by an optical system because of the position of the temperature sensor.

For the foregoing reasons, there is a need for a display device capable of detecting a partial heat generation state of a display region without lowering the transmittance of the display region.

SUMMARY

According to an aspect, a display device includes: a substrate having a display region; and a plurality of temperature detection wiring lines each having a conductive thin wiring line arranged at a position overlapping with the display region in plan view. A light shielding layer is arranged so as to extend in a first direction in the display region, and the conductive thin wiring line is arranged at a position overlapping with the light shielding layer and extends in the first direction along the light shielding layer in plan view.

DETAILED DESCRIPTION

A mode for carrying out the present disclosure (embodiment) will be described in detail with reference to the drawings. Contents described in the following embodiment do not limit the present disclosure. Components described below include those that can be easily assumed by those skilled in the art and substantially the same components. Furthermore, the components described below can be appropriately combined. What is disclosed herein is merely an example, and it is needless to say that appropriate modifications within the gist of the disclosure at which those skilled in the art can easily arrive are encompassed in the scope of the present disclosure. In the drawings, widths, thicknesses, shapes, and the like of the components can be schematically illustrated in comparison with actual modes for clearer explanation. They are, however, merely examples and do not limit interpretation of the present disclosure. In the present specification and the drawings, the same reference numerals denote components similar to those described before with reference to the drawing that has already been referred to, and detail explanation thereof can be appropriately omitted.

Figure 1:
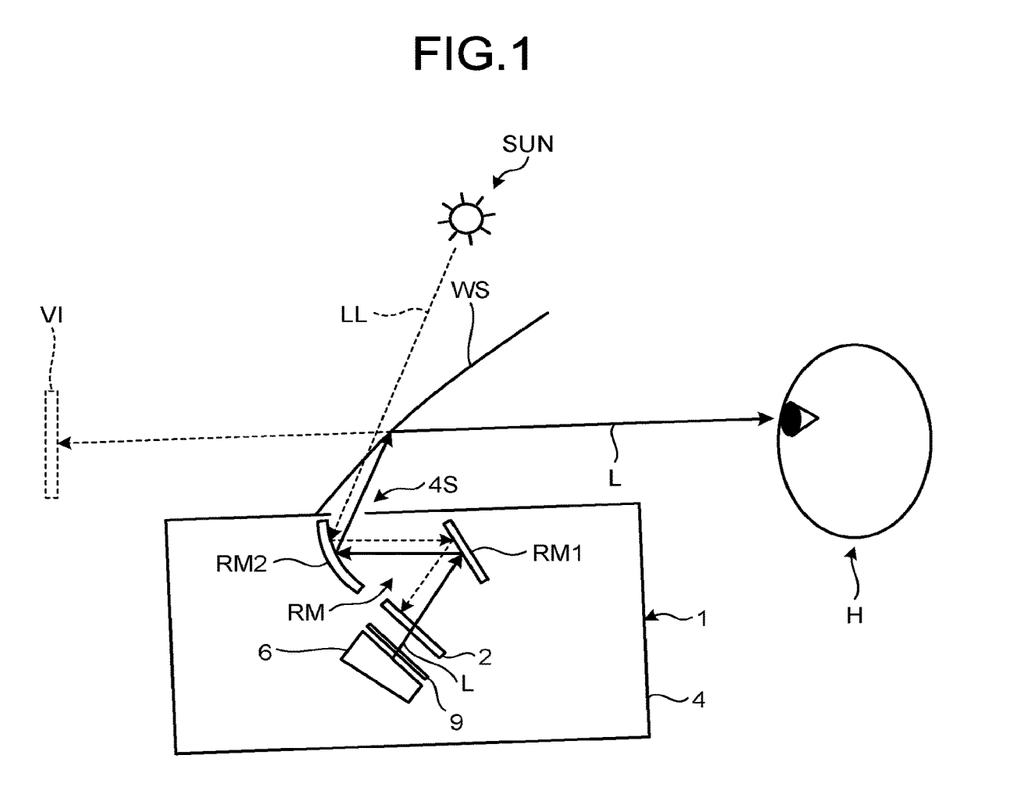
FIG. 1 is a descriptive diagram for schematically explaining a head-up display.

FIG. 1 is a descriptive diagram for schematically explaining a head-up display. A head-up display (hereinafter, referred to as HUD) device 1 includes a backlight (light source unit or light source device) 6, a diffusion plate 9, a display device 2, a windshield WS, and an optical system RM configured to enlarge an image from the display device 2 and project the image onto the windshield WS.

A housing 4 accommodates therein the backlight 6 functioning as a light source device, the display device 2 configured to output the image using light L from the backlight 6 as a light source, the diffusion plate 9 provided between the display device 2 and the backlight 6, and the optical system RM. The light L emitted from the backlight 6 is diffused by the diffusion plate 9 and passes through the display device 2 to be partially or fully transmitted. Then, the light L is reflected by the optical system RM and the windshield WS and reaches a user H to be recognized as an image VI in a field of view of the user H. In other words, the display device 2 in the embodiment functions as the head-up display (HUD) device 1 using the optical system RM and the windshield WS. It is sufficient that the windshield WS is a member having a light-transmitting property and located on the visual line of the user H, and the windshield WS may be, for example, a windscreen of a vehicle.

In the HUD device 1 in the embodiment, the optical system RM including a mirror member RM1 and a mirror member RM2 guides the light L after passing through the display device 2. The mirror member RM1 is a plane mirror, and the mirror member RM2 is a concave mirror. The mirror member RM1 may be a concave mirror. The optical system RM is not limited thereto, and the optical system RM may include one mirror member or three or more mirror members.

Figure 2:
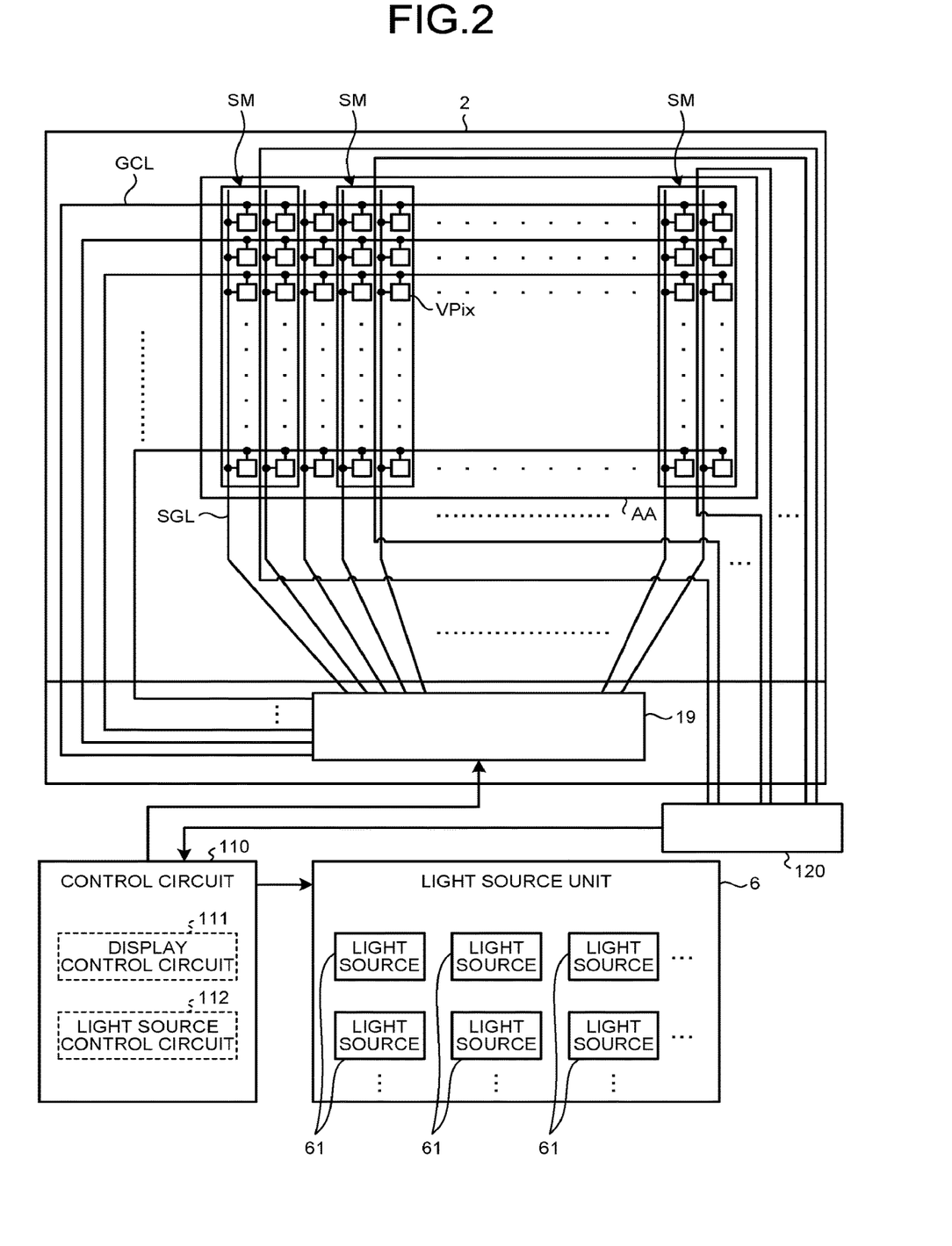
FIG. 2 is a descriptive diagram for schematically explaining a display device.
Figure 3:
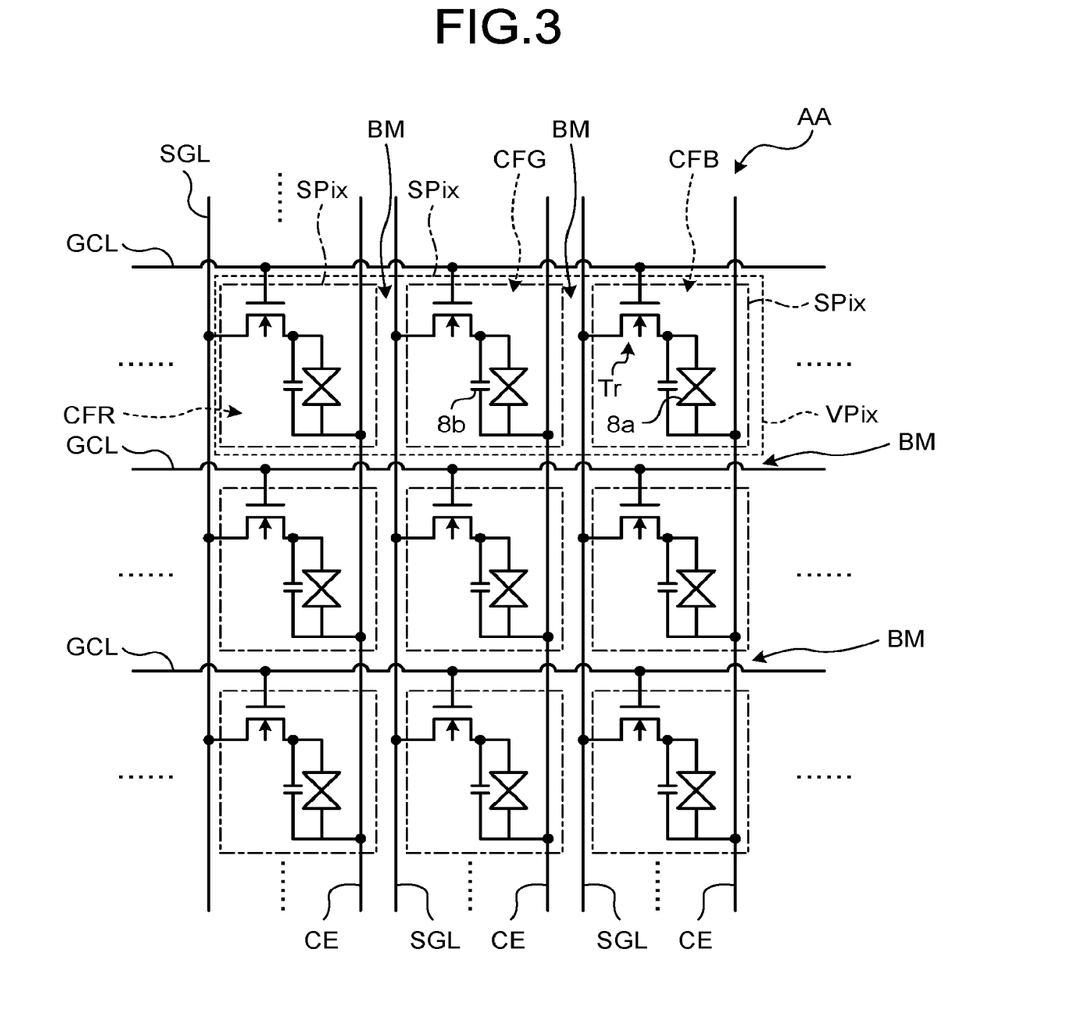
FIG. 3 is a descriptive diagram for explaining pixels of the display device.
Figure 4:
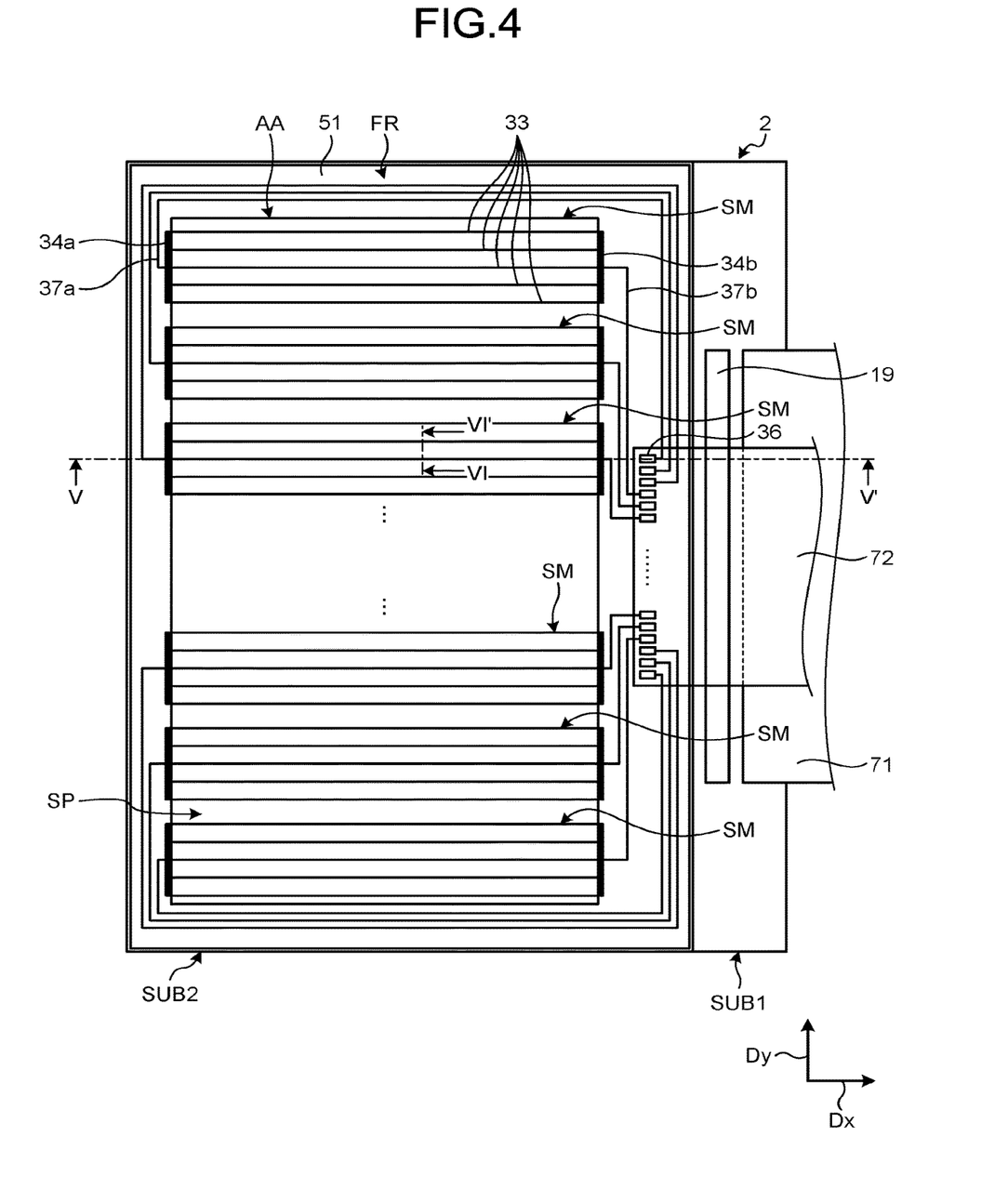
FIG. 4 is a plan view for explaining arrangement of temperature detection wiring lines.
Figure 5:
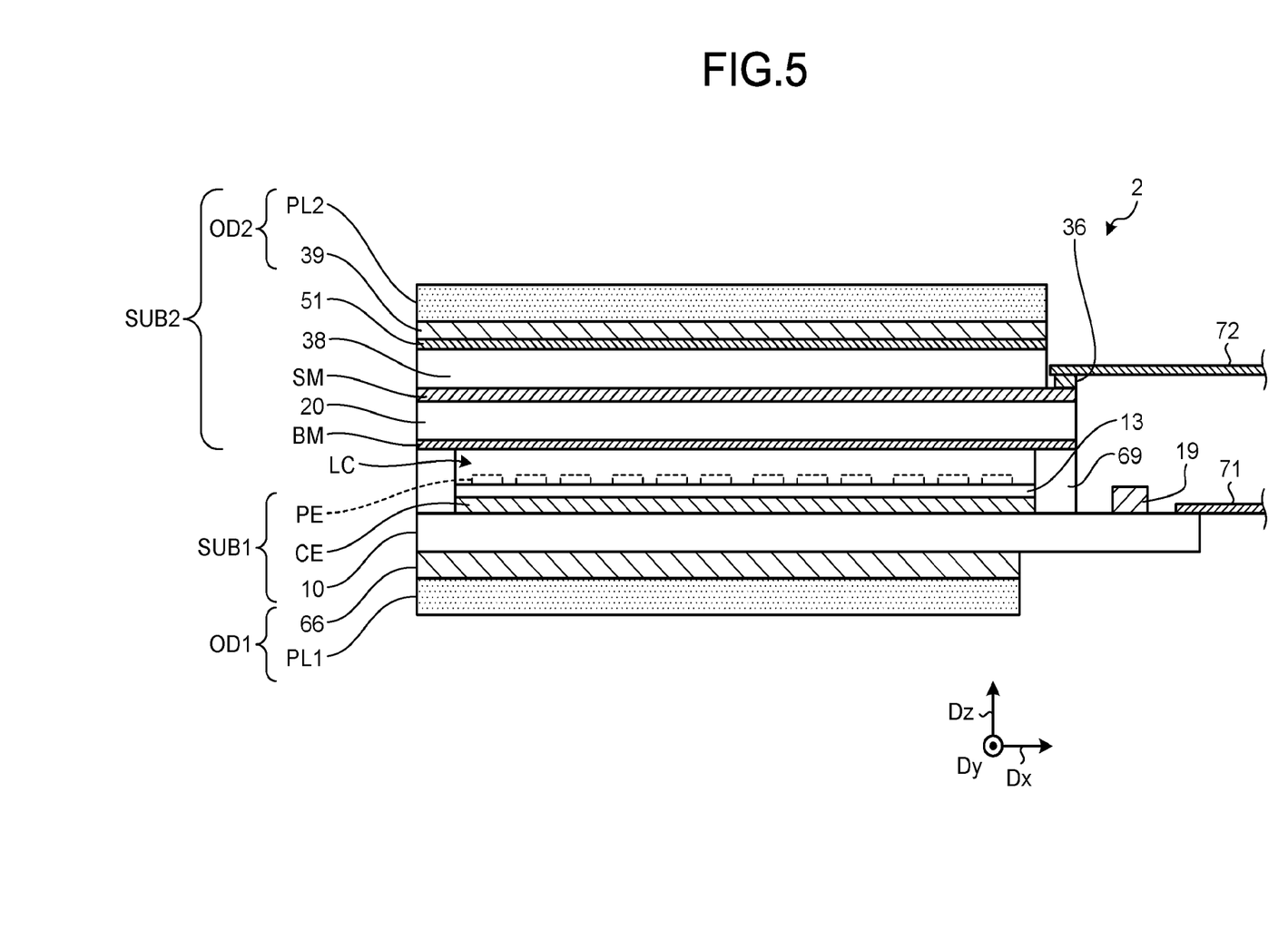
FIG. 5 is a cross-sectional view illustrating a schematic V-V' cross-section of the display device illustrated in FIG. 4.
Figure 6:
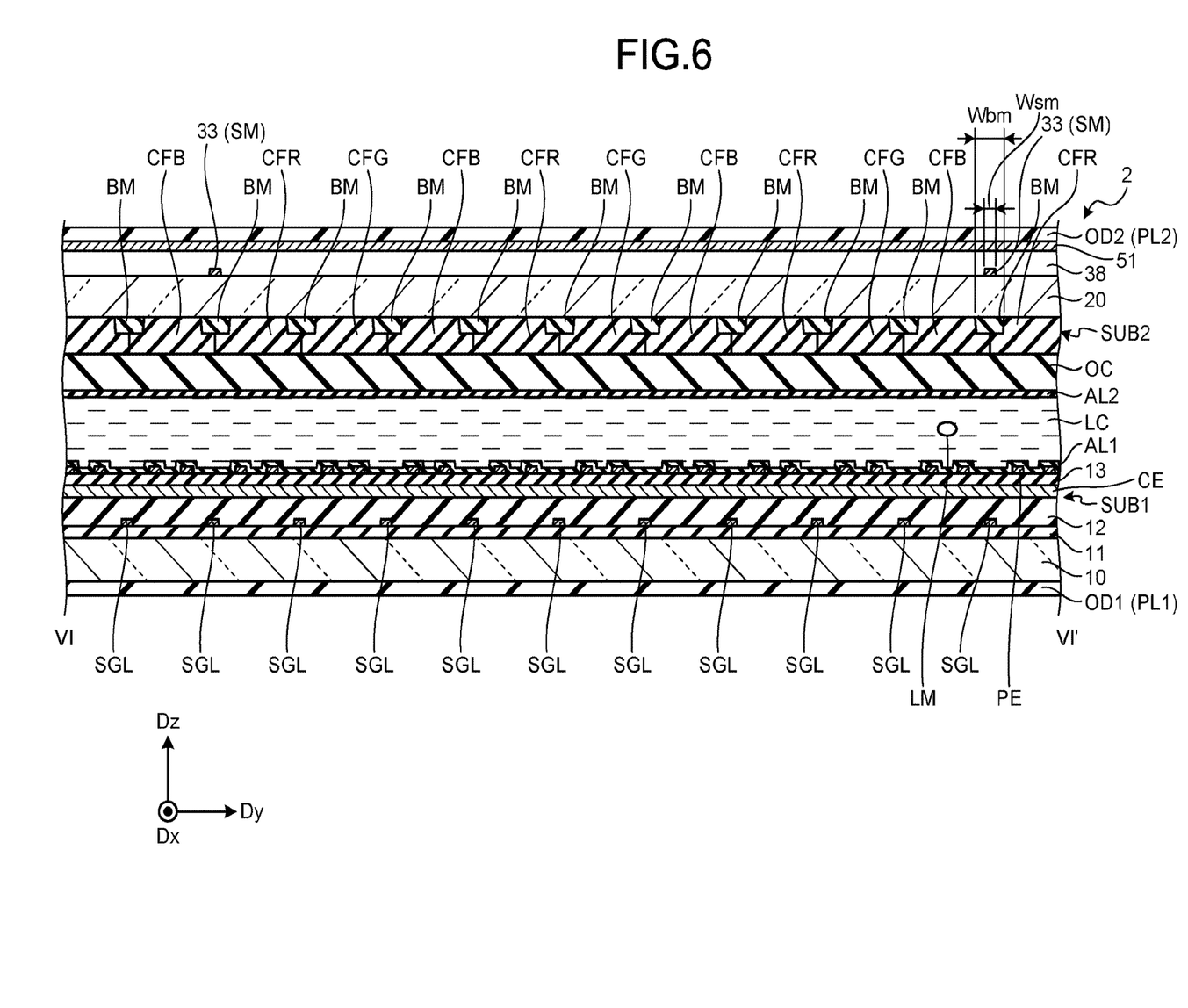
FIG. 6 is a cross-sectional view illustrating a schematic VI-VI' cross-section of the display device illustrated in FIG. 4.

Next, the display device 2 will be explained. FIG. 2 is a descriptive diagram for schematically explaining the display device. FIG. 3 is a descriptive diagram for explaining pixels of the display device. FIG. 4 is a plan view for explaining arrangement of temperature detection wiring lines. FIG. 5 is a cross-sectional view illustrating a schematic V-V' cross-section of the display device illustrated in FIG. 4. FIG. 6 is a cross-sectional view illustrating a schematic VI-VI' cross-section of the display device illustrated in FIG. 4. The display device 2 in the embodiment is a transmissive liquid crystal display that outputs an image using the light L as the light source. The display device 2 includes a display driver integrated circuit (DDIC) 19.

The display device 2 is also referred to as a display panel. As illustrated in FIG. 2, a large number of pixels VPix are arranged in a matrix with a row-column configuration in a display region AA of the display device 2.

Each of the pixels VPix illustrated in FIG. 3 has a plurality of sub pixels SPix. Each of the sub pixels SPix has a switching element Tr and a liquid crystal capacitor 8a. The switching element Tr includes a thin-film transistor. The switching element Tr includes an n-channel metal oxide semiconductor (MOS)-type TFT in this example. An insulating layer 13 is provided between pixel electrodes PE and common electrodes CE, thereby forming holding capacitors 8b illustrated in FIG. 3.

As illustrated in FIG. 2, a control circuit 110 functions as, for example, a display control circuit 111 and a light source control circuit 112. The display control circuit 111 outputs, for example, a master clock, a horizontal synchronization signal, a vertical synchronization signal, pixel signals, and a drive command signal for the backlight 6 to the DDIC 19. The pixel signal is, for example, a signal provided by combining individual gradation values of red (R), green (G), and blue (B). The display control circuit 111 has a function of controlling output gradation values of some or all of the pixels based on the light emission amounts of light sources 61 that are controlled by the light source control circuit 112. The light source control circuit 112 controls operations of the light sources 61 in synchronization with the pixel signals.

The switching elements Tr of the respective sub pixels SPix, signal lines SGL, scan lines GCL, and the like illustrated in FIG. 3 are formed on a first substrate 10 (see FIG. 5). The signal lines SGL are wiring lines for supplying the pixel signals to the pixel electrodes PE illustrated in FIG. 5. The scan lines GCL are wiring lines for supplying drive signals for driving the switching elements Tr. The signal lines SGL and the scan lines GCL extend in a plane parallel to the surface of the first substrate 10 illustrated in FIG. 5.

As illustrated in FIG. 3, light shielding layers BM are formed along the signal lines SGL and the scan lines GCL. Although FIG. 3 illustrates electrical coupling of the switching elements Tr, the light shielding layers BM also overlap the switching elements Tr actually. The sub pixels SPix have apertures surrounded by the light shielding layers BM, and color filters CFR, CFG, and CFB that are respectively colored in three colors of red (R), green (G), and blue (B) corresponds to the apertures of the sub pixels SPix illustrated in FIG. 3. The three colored filters CFR, CFG, and CFB are provided as one set. A set of the sub pixels SPix corresponding the color filters CFR, CFG, and CFB of three colors forms each pixel VPix. The color filters may include color regions of four or more colors.

The DDIC 19 illustrated in FIG. 2 functions as a gate driver to select each of the scan lines GCL sequentially. The DDIC 19 applies a scan signal to the gates of the switching elements Tr of the sub pixels SPix via the selected scan line GCL. Thus, one row (one horizontal line) of the sub pixels SPix is sequentially selected as a display drive target.

The DDIC 19 also functions as a source driver to supply the pixel signals to the sub pixels SPix included in the selected one horizontal line via the signal lines SGL. Display is performed on these sub pixels SPix on a horizontal line basis in accordance with the supplied pixel signals.

The DDIC 19 functions as a common electrode driver to apply a common potential to the common electrodes CE. The common potential is a direct-current (DC) voltage signal that is commonly applied to the sub pixels SPix.

As explained above, the DDIC 19 functions as the gate driver, the source driver, and the common electrode driver. The DDIC 19 may be configured such that the gate driver, the source driver, and the common electrode driver are provided separately from one another. At least one of the gate driver, the source driver, and the common electrode driver may be formed on the first substrate 10 using a thin film transistor (TFT).

As illustrated in FIG. 2, a plurality of temperature detection wiring lines SM are aligned. Both terminals of the temperature detection wiring lines SM are extended out and are electrically coupled to a resistance detection circuit 120. The resistance detection circuit 120 performs analog-to-digital (AD) conversion on resistances of the temperature detection wiring lines SM and outputs resistance detection signals to the control circuit 110.

Next, an example of the configuration of the display device 2 in the embodiment will be explained in detail. As illustrated in FIG. 5, the display device 2 includes an array substrate SUB1, a counter substrate SUB2, and a liquid crystal layer LC as a display function layer. The counter substrate SUB2 is arranged so as to face the surface of the array substrate SUB1 in the perpendicular direction. The liquid crystal layer LC is provided between the array substrate SUB1 and the counter substrate SUB2.

In the embodiment, the direction toward a second substrate 20 of the counter substrate SUB2 from the first substrate 10 of the array substrate SUB1 in the direction perpendicular to the surface of the first substrate 10 is the "upper side". The direction from the second substrate 20 toward the first substrate 10 is the "lower side".

The array substrate SUB1 includes the first substrate 10, the pixel electrodes PE, the common electrodes CE, and a polarization plate PL1. The switching elements Tr such as thin film transistors (TFTs) and various types of wiring lines such as the scan lines GCL and the signal lines SGL (not illustrated in FIG. 5) are provided on the first substrate 10.

The common electrodes CE are provided on the upper side of the first substrate 10. The pixel electrodes PE are provided on the upper side of the common electrodes CE with the insulating layer 13 interposed therebetween. The pixel electrodes PE are provided in a different layer from the common electrodes CE and are arranged so as to overlap the common electrodes CE in plan view. The pixel electrodes PE are arranged in a matrix with a row-column configuration in plan view. The polarization plate PL1 is provided on the lower side of the first substrate 10 with an adhesive layer 66 interposed therebetween. The pixel electrodes PE and the common electrodes CE are formed of a conductive material having a light-transmitting property, such as indium tin oxide (ITO). Although the embodiment describes the example in which the pixel electrodes PE are provided on the upper side of the common electrodes CE, the common electrodes CE may be provided on the upper side of the pixel electrodes PE.

The DDIC 19 and a flexible substrate 71 are provided on the first substrate 10. The DDIC 19 functions as the control circuit 110 illustrated in FIG. 2.

The counter substrate SUB2 includes the second substrate 20, the light shielding layers BM formed on one surface of the second substrate 20, a shield conductive layer 51 provided on the other surface of the second substrate 20, the temperature detection wiring lines SM, a protective layer 38, an adhesive layer 39, and a polarization plate PL2. As illustrated in FIG. 6, the color filters CFR, CFG, and CFB are also formed on the one surface of the second substrate 20 in the same manner as the light shielding layers BM.

As illustrated in FIG. 4, the temperature detection wiring lines SM are aligned on the second substrate 20. As illustrated in FIG. 5, a flexible substrate 72 is coupled to the second substrate 20. The temperature detection wiring lines SM are electrically coupled to the flexible substrate 72 through terminal portions 36. The flexible substrate 72 is coupled to the resistance detection circuit 120 illustrated in FIG. 2. The detailed configuration of the temperature detection wiring lines SM will be described later.

The protective layer 38 is an insulating layer for protecting the temperature detection wiring lines SM. The protective layer 38 can be made of a light-transmitting resin such as acrylic resin. The shield conductive layer 51 is formed on the protective layer 38. In other words, the temperature detection wiring lines SM and the shield conductive layer 51 are on the upper side of the second substrate 20, and the temperature detection wiring lines SM are stacked below the shield conductive layer 51. The protective layer 38 electrically insulates the shield conductive layer 51 and the temperature detection wiring lines SM from each other.

The shield conductive layer 51 is a light-transmitting conductive layer and is formed of, for example, ITO, indium zinc oxide (IZO), SnO, or an organic conductive film. The shield conductive layer 51 may be an oxide layer containing, as main components, tin oxide ($SnO_2$) and silicon dioxide ($SiO_2$), an oxide layer containing, as main components, gallium oxide ($Ga_2O_3$), indium oxide ($In_2O_3$), and tin oxide ($SnO_2$), or a light-transmitting conductive layer made of, as a main material, ITO and containing silicon (Si). As illustrated in FIG. 5, the polarization plate PL2 is provided above the shield conductive layer 51 with the adhesive layer 39 interposed therebetween.

A first optical element OD1 including the polarization plate PL1 is arranged on the outer surface of the first substrate 10 or on the surface thereof facing the backlight 6 (see FIG. 2). A second optical element OD2 including the polarization plate PL2 is arranged on the outer surface of the second substrate 20 or the surface thereof on the observation position side. A first polarization axis of the polarization plate PL1 and a second polarization axis of the polarization plate PL2 have a crossed Nicol positional relation in plan view. The first optical element OD1 and the second optical element OD2 may include another optical layer such as a retardation plate.

The first substrate 10 and the second substrate 20 are arranged with a predetermined gap therebetween. A space between the first substrate 10 and the second substrate 20 is sealed by a seal portion 69. The liquid crystal layer LC is provided in the space enclosed by the first substrate 10, the second substrate 20, and the seal portion 69. The liquid crystal layer LC modulates light that passes therethrough in accordance with an electric field state, and liquid crystal in a transverse electric field mode such as in-plane switching (IPS) including fringe field switching (FFS) is used therefor. Orientation films (not illustrated) are respectively arranged between the liquid crystal layer LC and the array substrate SUB1 and between the liquid crystal layer LC and the counter substrate SUB2 illustrated in FIG. 5. In the embodiment, the liquid crystal layer LC is driven by transverse electric fields generated between the pixel electrodes PE and the common electrodes CE.

The backlight 6 illustrated in FIGS. 1 and 2 is provided on the lower side of the first substrate 10. Light from the backlight 6 passes through the array substrate SUB1 and is modulated in accordance with a state of the liquid crystal at its corresponding position, and a transmission state to the display surface changes depending on places. An image is thereby displayed in the display region AA of the display device 2.

Next, the VI-VI' cross-section illustrated in FIG. 4 will be explained in detail. In FIG. 6, the array substrate SUB1 includes, as a base body, the first substrate 10 having a light-transmitting property and an insulating property, such as a glass substrate or a resin substrate. The array substrate SUB' includes a first insulating layer 11, a second insulating layer 12, a third insulating layer 13, the signal lines SGL, the pixel electrodes PE, the common electrodes CE, and a first orientation film AL1 on the side of the first substrate 10 that faces the counter substrate SUB2.

Although not observed in the cross-section of FIG. 6, the scan lines GCL and gate electrodes of the switching elements Tr (see FIG. 3) are provided on the first substrate 10, and the first insulating layer 11 illustrated in FIG. 6 covers the scan lines GCL and the gate electrodes. An insulating layer made of an inorganic material having a light-transmitting property, such as silicon oxide or silicon nitride, may be further provided under the first insulating layer 11, the scan lines GCL, and the gate electrodes.

Semiconductor layers of the switching elements Tr (see FIG. 4) are stacked on the first insulating layer 11 although not observed in the cross-section of FIG. 6. The semiconductor layers are formed with amorphous silicon, for example, but may be formed with polysilicon or oxide semiconductor.

As illustrated in FIG. 6, the second insulating layer 12 covers the signal lines SGL. The second insulating layer 12 is made of a resin material having a light-transmitting property, such as acrylic resin, and has a film thickness greater than those of the other insulating films made of inorganic materials. The second insulating layer 12 may also be made of an inorganic material.

Although not observed in the cross-section of FIG. 6, source electrodes of the switching elements Tr (see FIG. 3) that partially cover the semiconductor layers and drain electrodes of the switching elements Tr (see FIG. 3) that partially cover the semiconductor layers, are provided on the second insulating layer 12. The drain electrodes are made of the same material as those of the signal lines SGL. The third insulating layer 13 is provided on the semiconductor layers of the switching elements Tr (see FIG. 3). Although the switching elements Tr explained above are of a bottom gate type, they may be of a top gate type.

The common electrodes CE are located on the second insulating layer 12. In FIG. 6, the common electrodes CE face the signal lines SGL with the second insulating layer 12 interposed therebetween. The second insulating layer 12 is made of an inorganic material having a light-transmitting property, such as silicon oxide or silicon nitride.

The third insulating layer 13 covers the common electrodes CE. The third insulating layer 13 is made of an inorganic material having a light-transmitting property, such as silicon oxide or silicon nitride.

The pixel electrodes PE are located on the third insulating layer 13 and face the common electrodes CE with the third insulating layer 13 interposed therebetween. The pixel electrodes PE and the common electrodes CE are made of a conductive material having a light-transmitting property, such as indium tin oxide (ITO) and indium zinc oxide (IZO). The first orientation film AL1 covers the pixel electrodes PE. The first orientation film AL1 also covers the third insulating layer 13.

The counter substrate SUB2 includes, as a base body, the second substrate 20 having a light-transmitting property and an insulating property, such as a glass substrate or a resin substrate. The counter substrate SUB2 includes the light shielding layers BM, the color filters CFR, CFG, and CFB, an overcoat layer OC, and a second orientation film AL2 on the side of the second substrate 20 that faces the array substrate SUB1.

As illustrated in FIG. 6, the light shielding layers BM are located on the side of the second substrate 20 that faces the array substrate SUB1. As illustrated in FIG. 6, the light shielding layers BM define apertures AP that respectively face the pixel electrodes PE. The light shielding layers BM are made of a resin material in black color or a metal material having a light shielding property.

The color filters CFR, CFG, and CFB are located on the side of the second substrate 20 that faces the array substrate SUB1, and end portions thereof overlap with the light shielding layers BM. As an example, the color filters CFR, CFG, and CFB are made of resin materials colored in red, green, and blue, respectively.

The overcoat layer OC covers the color filters CFR, CFG, and CFB. The overcoat layer OC is made of a resin material having a light-transmitting property. The second orientation film AL2 covers the overcoat layer OC. The first orientation film AL1 and the second orientation film AL2 are made of, for example, a horizontally oriented material.

The counter substrate SUB2 includes the light shielding layers BM and the color filters CFR, CFG, and CFB. The light shielding layers BM are arranged in a region facing a wiring portion including the scan lines GCL, the signal lines SGL, and the switching elements Tr illustrated in FIG. 3.

In FIG. 6, the counter substrate SUB2 includes the color filters CFR, CFG, and CFB of three colors. Alternatively, the counter substrate SUB2 may include color filters of four or more colors that include a color filter different from the color filters in blue, red, and green, and include, for example, white, clear, yellow, magenta, and/or cyan. The array substrate SUB1 may include these color filters CFR, CFG, and CFB.

The array substrate SUB1 and the counter substrate SUB2 mentioned above are arranged such that the first orientation film AL1 and the second orientation film AL2 face each other. The liquid crystal layer LC is sealed in between the first orientation film AL1 and the second orientation film AL2. The liquid crystal layer LC is made of a negative liquid crystal material having a negative dielectric anisotropy or a positive liquid crystal material having a positive dielectric anisotropy.

The array substrate SUB1 faces the backlight 6 (see FIG. 1), and the counter substrate SUB2 is located on the display surface side. Various types can be applied to the backlight 6, and explanation of the detail configuration thereof is omitted.

For example, when the liquid crystal layer LC is made of the negative liquid crystal material and no voltage is applied to the liquid crystal layer LC, liquid crystal molecules LM are initially oriented in such a direction that long axes thereof are along a first direction Dx in a Dx-Dy plane illustrated in FIG. 4. On the other hand, when a voltage is applied to the liquid crystal layer LC, that is, when the liquid crystal layer LC is in an ON state in which the electric fields are formed between the pixel electrodes PE and the common electrodes CE, the liquid crystal molecules LM are influenced by the electric fields and the orientation states thereof are changed. In the ON state, a polarization state of linearly polarized light that is incident thereon is changed in accordance with the orientation states of the liquid crystal molecules LM when it passes through the liquid crystal layer LC.

The temperature detection wiring lines SM will be explained in detail below. As illustrated in FIG. 4, each temperature detection wiring line SM includes a plurality of conductive thin wiring lines 33, a first coupling wiring line 34a, and a second coupling wiring line 34b. First ends of the conductive thin wiring lines 33 are electrically coupled to each other by the first coupling wiring line 34a, and second ends of the conductive thin wiring lines 33 are electrically coupled to each other by the second coupling wiring line 34b.

Each conductive thin wiring line 33 is formed with a metal layer made of one or more elements selected from aluminum (Al), copper (Cu), silver (Ag), molybdenum (Mo), chromium (Cr), titanium (Ti), and tungsten (W). Alternatively, the conductive thin wiring line 33 is formed with a metal layer made of an alloy containing one or more elements selected from aluminum (Al), copper (Cu), silver (Ag), molybdenum (Mo), chromium (Cr), titanium (Ti), and tungsten (W). The conductive thin wiring line 33 can be made of, for example, an aluminum alloy such as AlNd, AlCu, AlSi, and AlSiCu. The conductive thin wiring line 33 may be a multilayered body formed by stacking a plurality of conductive layers made of the above-mentioned metal material or the alloy containing one or more of the above-mentioned materials.

A width Wsm of the conductive thin wiring line 33 (temperature detection wiring line SM) illustrated in FIG. 6 is a length in a direction orthogonal to the lengthwise direction and is, for example, preferably in a range of 1 μm to 10 μm, and more preferably in a range of 1 μm to 5 μm. When the width Wsm is equal to or less than 10 μm, the width Wsm can be set to be less than a width Wbm of the light shielding layer BM. This is preferable because the possibility that an aperture ratio is reduced is lowered. When the width Wsm is equal to or greater than 1 μm, the shapes of the conductive thin wiring line 33 (temperature detection wiring line SM) is made stable. This is also preferable because the possibility that the conductive thin wiring line 33 is broken is lowered.

First wiring lines 37a are respectively coupled to the first coupling wiring lines 34a. Second wiring lines 37b are respectively coupled to the second coupling wiring lines 34b. That is to say, in the embodiment, the first wiring lines 37a are respectively coupled to first ends of the temperature detection wiring lines SM, and the second wiring lines 37b are respectively coupled to second ends thereof. The first wiring lines 37a are provided along a peripheral region FR. The second wiring lines 37b are provided along the peripheral region FR.

The first wiring line 37a and the second wiring line 37b coupled to one temperature detection wiring line SM are coupled to the different terminal portions 36. That is to say, the first wiring line 37a as the first end of the temperature detection wiring line SM and the second wiring line 37b as the second end of the temperature detection wiring line SM are extended to the flexible substrate 72 with the respective terminal portions 36 interposed therebetween. The first wiring lines 37a of the temperature detection wiring lines SM and the second wiring lines 37b of the temperature detection wiring lines SM are electrically coupled to the resistance detection circuit 120 illustrated in FIG. 2 via the flexible substrate 72. The resistance detection circuit 120 detects resistance change that varies depending on temperature change between the first wiring line 37a as the first end of the temperature detection wiring line SM and the second wiring line 37b as the second end of the temperature detection wiring line SM.

The first wiring lines 37a and the second wiring lines 37b can be made of the same material as the metal material, the alloy, or the like that is used for the conductive thin wiring lines 33. It is sufficient that the first wiring lines 37a and the second wiring lines 37b are made of a material having favorable conductivity, and a material differing from that of the conductive thin wiring lines 33 may be used therefor.

The first ends of more than one of the conductive thin wiring lines 33 are electrically coupled to each other by being coupled to the first coupling wiring line 34a. The second ends of more than one of the conductive thin wiring lines 33 are electrically coupled to each other by being coupled to the second coupling wiring line 34b. The first wiring lines 37a are electrically coupled to the respective first coupling wiring lines 34a, and the second wiring lines 37b are electrically coupled to the respective second coupling wiring lines 34b. With this configuration, each of the temperature detection wiring lines SM can detect the partial heat generation state of the display region AA in a region having a predetermined area. The resistance value of each temperature detection wiring line SM is adjusted in accordance with the number of conductive thin wiring lines 33.

The conductive thin wiring lines 33 are arranged at positions overlapping with the light shielding layers BM in plan view. The conductive thin wiring lines 33 extend in the first direction along the light shielding layers BM. The planar shapes of the conductive thin wiring lines 33 are not limited to linear metal thin wiring line shapes. When the signal lines SGL have, for example, zigzag shapes or wavy line shapes in plan view, the planar shapes of the conductive thin wiring lines 33 may be zigzag shapes or wavy line shapes along the shapes of the signal lines SGL.

As illustrated in FIG. 4, the width of slits SP between the adjacent temperature detection wiring lines SM in a second direction Dy is desirably the same as a spacing between the adjacent conductive thin wiring lines 33. The spacing of the conductive thin wiring lines 33 are thereby made uniform in the plane, so that undesired diffraction light is reduced.

In FIG. 6, eight light shielding layers BM overlapping with no conductive thin wiring line 33 are formed between one light shielding layer BM overlapping with the conductive thin wiring line 33 and another light shielding layer BM overlapping with the conductive thin wiring line 33. Dummy conductive thin wiring lines that are not electrically coupled to the first wiring lines 37a or the second wiring lines 37b may be provided, and the dummy conductive thin wiring lines may overlap with the light shielding layers BM overlapping with no conductive thin wiring line 33.

As illustrated in FIG. 4, the shield conductive layer 51 is provided in order to reduce static electricity when the display device 2 is manufactured and used. In the case where the shield conductive layer 51 is not provided, when electromagnetic noise such as static electricity enters from the outside, the electromagnetic noise reduction effect may not be sufficiently obtained because there are regions with no conductive thin wiring line 33.

As illustrated in FIG. 4, the shield conductive layer 51 is formed on substantially the entire surface of the second substrate 20 and is provided over the entire surface of the display region AA and the peripheral region FR. In other words, the shield conductive layer 51 has a portion that overlaps the conductive thin wiring lines 33 and a portion that does not overlap any conductive thin wiring line 33.

The shield conductive layer 51 is preferably arranged so as to extend to end portions of the second substrate 20. Furthermore, the shield conductive layer 51 is electrically coupled from the peripheral region FR to a fixed potential such as a power supply or ground by conductive tape or the like.

The shield conductive layer 51 is preferably provided at positions overlapping with the first coupling wiring lines 34a, the second coupling wiring lines 34b, the first wiring lines 37a, and the second wiring lines 37b, as illustrated in FIG. 4. The area of the shield conductive layer 51 in plan view is larger than the total area of the conductive thin wiring lines 33.

As explained above, the display device 2 in the embodiment includes the substrate having the display region AA and the temperature detection wiring lines SM. The temperature detection wiring lines SM each include the conductive thin wiring lines 33 arranged at positions overlapping with the display region AA in plan view. The light shielding layers BM are arranged so as to extend in the first direction Dx in the display region AA. The conductive thin wiring lines 33 of the temperature detection wiring lines SM are arranged at positions overlapping with the light shielding layers and extend in the first direction along the light shielding layers. This configuration allows the temperature detection wiring lines SM to detect the partial heat generation state of the display region AA without lowering the transmittance of the display region because they do not block the apertures of the sub pixels SPix.

Figure 7:
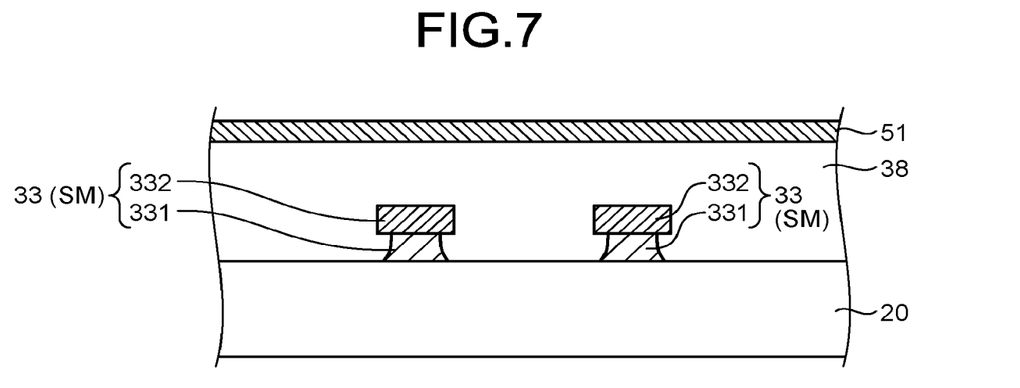
FIG. 7 is a cross-sectional view for explaining the temperature detection wiring lines.

Conductive layers 331 are formed on the second substrate 20 in the embodiment. Conductive layers 332 are formed on the conductive layers 331. The protective layer 38 is formed on the conductive layers 331 and the conductive layers 332. The protective layer 38 is made of the light-transmitting resin such as acrylic resin having the insulating property. The shield conductive layer 51 is formed on the protective layer 38. In other words, the temperature detection wiring lines SM and the shield conductive layer 51 are above the second substrate 20, and the temperature detection wiring lines SM are stacked below the shield conductive layer 51. The shield conductive layer 51 and the temperature detection wiring lines SM are insulated from each other by the protective layer 38. As a result, when heat and light act simultaneously on the shield conductive layer 51 and the temperature detection wiring lines SM, resistance change in the temperature detection wiring lines SM in accordance with temperature change caused by heat is not affected even if resistance is change in the shield conductive layer 51 in accordance with temperature change caused by light.

The shield conductive layer 51 is made of, for example, one or more materials selected from ITO, indium zinc oxide (IZO), and SnO.

The conductive layer 331 may be a multilayered body formed by stacking at least two of metal layers each made of one or more elements selected from aluminum (Al), copper (Cu), silver (Ag), molybdenum (Mo), chromium (Cr), titanium (Ti), and tungsten (W) and metal layers each made of an alloy containing any of these elements. Similarly, the conductive layer 332 may be a multilayered body formed by stacking at least two of the metal layers each made of one or more elements selected from aluminum (Al), copper (Cu), silver (Ag), molybdenum (Mo), chromium (Cr), titanium (Ti), and tungsten (W), metal layers each made of an alloy containing any of these elements, an oxide layer containing, as main components, tin oxide ($SnO_2$) and silicon dioxide ($SiO_2$), and an oxide layer containing, as main components, gallium oxide ($Ga_2O_3$), indium oxide ($In_2O_3$), and tin oxide ($SnO_2$).

A material that suppresses light reflection more than a material used for the conductive layer 331 is selected to be used for the conductive layer 332. Thus, the visible light reflectivity of the conductive layer 332 is lower than the visible light reflectivity of the conductive layer 331, and the conductive layer 332 is closer in color to black than the conductive layer 331 is.

To make the conductive layer 332 closer in color to black than the conductive layer 331 is, a resistance value of the conductive layer 332 is increased. For this reason, a material having a higher conductivity than that of the conductive layer 332 is selected for the conductive layer 331. Consequently, power consumption in the temperature detection wiring SM can be restrained from increasing.

Measurement of Temperature

Figure 8:
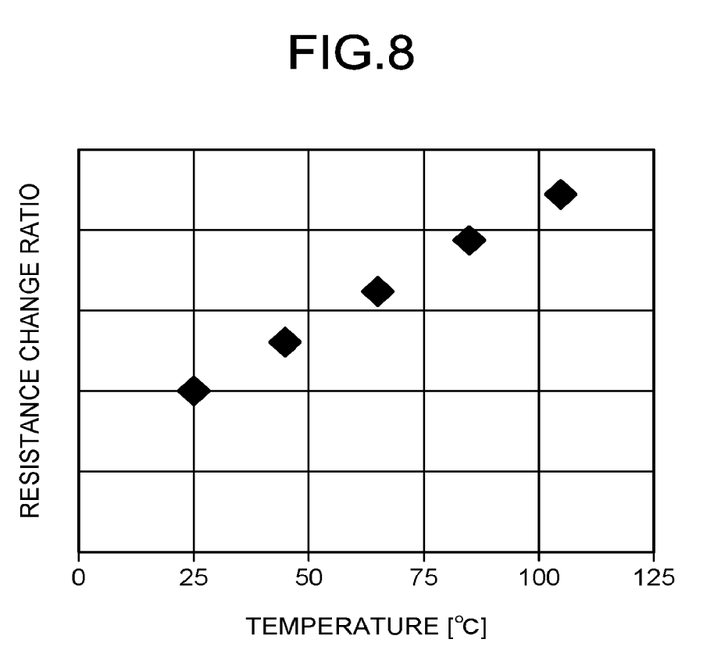
FIG. 8 is a descriptive view illustrating a resistance change ratio of one temperature detection wiring line with respect to the temperature thereof.
Figure 9:
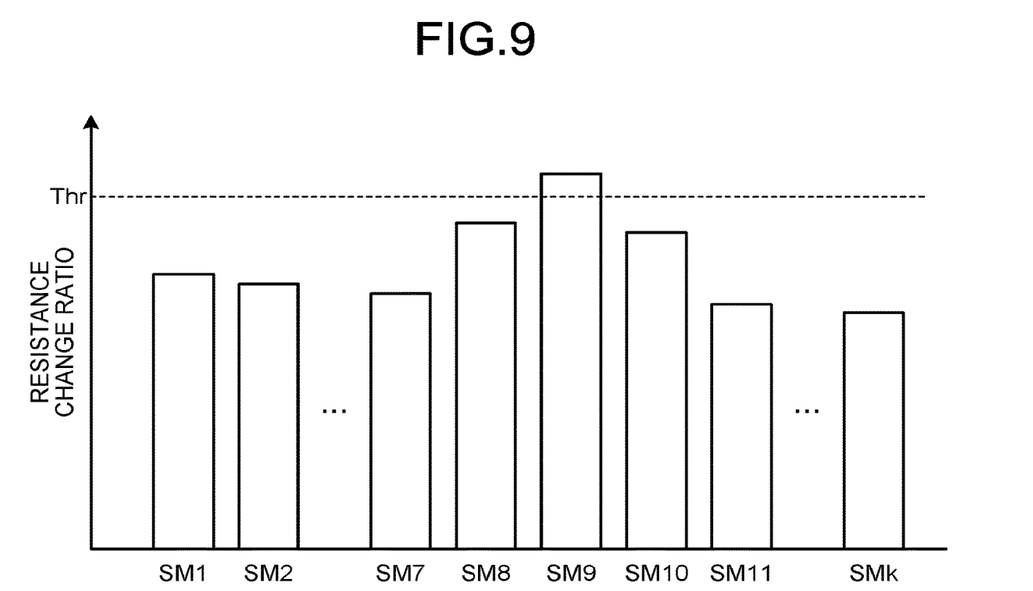
FIG. 9 is a descriptive view illustrating an example of distribution of the resistance change ratios of the temperature detection wiring lines.

FIG. 8 illustrates a resistance change ratio of one temperature detection wiring line with respect to the temperature thereof. FIG. 9 is a descriptive view illustrating an example of distribution of the resistance change ratios of the temperature detection wiring lines. As illustrated in FIG. 8, the resistance change ratio of the temperature detection wiring line SM with respect to a resistance value of a reference temperature, for example, linearly changes depending on the temperature.

As illustrated in FIG. 1, sunlight LL may enter the HUD device 1 through an opening 4S of the housing 4 depending on a relative position of the sun SUN. The sunlight LL is guided by the optical system RM, is condensed toward the display device 2, and hits a part of the display region in some cases. The condensed sunlight possibly deteriorates the display device, and it is therefore desired that the partial heat generation state of the display region is detected.

In the embodiment, as illustrated in FIG. 4, the temperature detection wiring lines SM are aligned at the positions overlapping with the display region AA in plan view, thereby determining a position of the display region AA exposed to the sunlight LL using the temperature detection wiring line SM where the temperature has risen.

Assume that, for example, the temperature detection wiring lines SM are arranged in the display region AA in FIG. 4 such that a temperature detection wiring line SM1 to a temperature detection wiring line SMk illustrated in FIG. 9 are aligned in the Dy direction. The resistance detection circuit 120 illustrated in FIG. 2 performs AD conversion on the resistances of the temperature detection wiring line SM1 to the temperature detection wiring line SMk and outputs resistance detection signals to the control circuit 110. As illustrated in FIG. 9, when the resistance change ratio of the temperature detection wiring line SM9 is equal to or higher than a predetermined threshold Thr and the resistance change ratios of the other temperature detection wiring lines SM1 to SM7 and SM11 to SMk are lower than the threshold Thr, the control circuit 110 determines that a region overlapping with the temperature detection wiring line SM9 in the display region AA is exposed to the sunlight LL.

When the temperature detection wiring line SM is exposed to the sunlight LL, the sunlight LL is possibly reflected by the temperature detection wiring line SM. As illustrated in FIG. 1, even when the mounting position of the display device 2 is adjusted so as to prevent regular reflection light of the sunlight LL from returning to the windshield WS, diffracted light generated by the conductive thin wiring lines 33 may reach the windshield WS.

In the embodiment, the display device 2 includes the second substrate 20 having the display region and the temperature detection wiring lines SM arranged at the positions overlapping with the display region AA in plan view. The temperature detection wiring lines SM include the first conductive layers 331 stacked on the upper side of the second substrate 20 and the second conductive layers 332 stacked on the first conductive layers 331. The visible light reflectivity of the second conductive layers 332 is lower than the visible light reflectivity of the first conductive layers 331. With this configuration, even when the temperature detection wiring SM is exposed to the sunlight LL, the diffracted light at the temperature detection wiring SM is reduced. As a result, display quality of the image VI that is recognized in the field of view of the user H illustrated in FIG. 1 is improved.

As illustrated in FIG. 7, the second conductive layers 332 have a greater width than those of the first conductive layers 331, and therefore, even when the first conductive layers 331 reflect the sunlight LL, the second conductive layers 332 cover them, so that the diffracted light at the temperature detection wiring lines SM is reduced.

Other operation effects provided by the mode described in the embodiment that are obvious from the present disclosure or at which those skilled in the art can appropriately arrive should be interpreted to be provided by the present disclosure.

Although the preferred embodiment has been explained above, the present disclosure is not limited to the embodiment. The contents disclosed in the embodiment are merely examples, and various modifications are possible in a range without departing from the gist of the present disclosure. It is needless to say that appropriate modifications made in the range without departing from the gist of the present disclosure also belong to the technical scope of the present disclosure.

For example, although a liquid crystal panel is exemplified as the display device 2, the display device 2 may be an organic electroluminescence (EL) panel. It can be a micro LED that displays an image by emitting different light from each light emitting element LED. The light emitting element LED has a size of about 3 μm to 100 μm in plan view.

What is claimed is:

1. A display device comprising:
   a substrate having a display region;
   a plurality of temperature detection wiring lines each having a conductive thin wiring line arranged on the substrate at a position overlapping with the display region in plan view;
   a first wiring line coupled to a first end of the conductive thin wiring line;
   a second wiring line coupled to a second end of the conductive thin wiring line;
   a flexible substrate with terminal portions, the flexible substrate being coupled to the substrate; and
   a resistance detection circuit;
   wherein a light shielding layer is arranged so as to extend in a first direction in the display region, the conductive thin wiring line is arranged at a position overlapping with the light shielding layer and extends in the first direction along the light shielding layer in plan view, each of the temperature detection wiring lines includes a plurality of the conductive thin wiring lines, and the resistance detection circuit detects resistance change in accordance with temperature change between:

- the first wiring line that is electrically coupled to a first coupling wiring line that is electrically coupled to a plurality of the first ends of the conductive thin wiring lines; and
- the second wiring line that is electrically coupled to a second coupling wiring line that is electrically coupled to a plurality of the second ends of the conductive thin wiring lines;

the first wiring line and the second wiring line that are coupled to a same one of the temperature detection wiring lines are coupled to the resistance detection circuit via different terminal portions to the flexible substrate, each of the temperature detection wiring lines detects a partial heat generation state of the display region in a region having a predetermined area, and a resistance value of each temperature detection wiring line is adjusted in accordance with a number of conductive thin wiring lines.

2. The display device according to claim 1, wherein a width of the conductive thin wiring line in a second direction orthogonal to the first direction is less than a width of the light shielding layer in the second direction.

3. The display device according to claim 1, wherein a width of the conductive thin wiring line is in a range from 1 μm to 10 μm.

* * * * *